US011881944B2

United States Patent
Dai et al.

(10) Patent No.: US 11,881,944 B2
(45) Date of Patent: Jan. 23, 2024

(54) UPLINK SIGNAL SENDING METHOD AND TERMINAL

(71) Applicant: HUAWEI TECHNOLOGIES CO., LTD., Guangdong (CN)

(72) Inventors: Xizeng Dai, Beijing (CN); Hong Wang, Beijing (CN); Jian Zhang, Shenzhen (CN); Xingqing Cheng, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 420 days.

(21) Appl. No.: 17/332,559

(22) Filed: May 27, 2021

(65) Prior Publication Data
US 2021/0288753 A1 Sep. 16, 2021

Related U.S. Application Data

(63) Continuation of application No. PCT/CN2018/118721, filed on Nov. 30, 2018.

(51) Int. Cl.
*H04L 1/00* (2006.01)
*H04W 36/00* (2009.01)
*H04W 8/24* (2009.01)
*H04W 36/08* (2009.01)

(52) U.S. Cl.
CPC ............. *H04L 1/0068* (2013.01); *H04W 8/24* (2013.01); *H04W 36/00837* (2018.08); *H04W 36/08* (2013.01)

(58) Field of Classification Search
None
See application file for complete search history.

(56) References Cited

U.S. PATENT DOCUMENTS

| 9,680,618 | B2 * | 6/2017 | Pajukoski | ............. H04L 5/0005 |
|---|---|---|---|---|
| 2014/0050205 | A1 | 2/2014 | Ahn et al. | |
| 2021/0045143 | A1 * | 2/2021 | Ji | ............. H04W 72/21 |
| 2021/0298008 | A1 * | 9/2021 | Yamamoto | ............. H04W 28/04 |

FOREIGN PATENT DOCUMENTS

| CN | 101005691 A | 7/2007 |
|---|---|---|
| CN | 101931437 A | 12/2010 |
| CN | 104348589 A | 2/2015 |

(Continued)

OTHER PUBLICATIONS

Nokia Siemens Networks et al., "Analysis on NBAP Impact for Enhanced Uplink in Cell_FACH," 3GPP Tsg-Ran WG3 Meeting #60, R3-081273, Kansas City, USA, May 5-9, 2008, 29 pages.

(Continued)

*Primary Examiner* — Anh Ngoc M Nguyen
(74) *Attorney, Agent, or Firm* — Fish & Richardson P.C.

(57) ABSTRACT

Example uplink signal sending methods and apparatus are described. One example method includes determining, by a terminal, a symbol that needs to be punctured, and sending the uplink signal by the terminal based on the symbol that needs to be punctured. Further, the terminal may notify the source cell and/or the target cell of the symbol that needs to be punctured, so that the source cell or the target cell improves, according to a notification indication, decoding on the uplink signal sent by the terminal.

12 Claims, 7 Drawing Sheets

(56) References Cited

FOREIGN PATENT DOCUMENTS

| | | |
|---|---|---|
| CN | 105229962 A | 1/2016 |
| CN | 105917719 A | 8/2016 |
| CN | 107872856 A | 4/2018 |
| CN | 108886457 A | 11/2018 |
| KR | 20160099500 A | 8/2016 |
| TW | 201820813 A | 6/2018 |
| WO | 2018201902 A1 | 11/2018 |

OTHER PUBLICATIONS

Office Action in Chinese Appln. No. 201880099724.2, dated Jan. 18, 2023, 4 pages.

Extended European Search Report issued in European Application No. 18941379.2 dated Nov. 24, 2021, 12 pages.

Huawei, HiSilicon, "Close to O ms HO interruption time for single Tx/Rx UE," 3GPP TSG-RAN WG2 #97bis, R2-1703382, Spokane, US, Apr. 3-7, 2017, 8 pages.

Office Action issued in Indian Application No. 202137029244 dated Mar. 8, 2022, 5 pages.

Office Action issued in Chinese Application No. 201880099724.2 dated Aug. 23, 2022, 12 pp. (with English ranslation).

3GPP TS 36.213 V12.13.0 "3rd Generation Partnership Project; Technical Specification Group Radio Access Network; Evolved Universal Terrestrial Radio Access (E-UTRA); Physical layer procedures (Release 12)," Sep. 2018, 241 pages.

3GPP TS 38.213 V15.3.0, "3rd Generation Partnership Project; Technical Specification Group Radio Access Network; NR; Physical layer procedures for control (Release 15)," Sep. 2018, 101 pages.

3GPP TS 38.306 V15.3.0, "3rd Generation Partnership Project; Technical Specification Group Radio Access Network; NR; User Equipment (UE) radio access capabilities (Release 15)," Sep. 2018, 31 pages.

3GPP TS 38.331 V15.3.0, "3rd Generation Partnership Project; Technical Specification Group Radio Access Network; NR; Radio Resource Control (RRC) protocol specification (Release 15)," Sep. 2018, 445 pages.

International Search Report and Written Opinion in International Application No. PCT/CN2018/118721, dated Jun. 25, 2019, 200 pages.

\* cited by examiner

UPLINK SIGNAL SENDING METHOD AND TERMINAL

CROSS-REFERENCE TO RELATED APPLICATIONS

This application is a continuation of International Application No. PCT/CN2018/118721, filed on Nov. 30, 2018, the disclosure of which is hereby incorporated by reference in its entirety.

TECHNICAL FIELD

This application relates to the field of communications technologies, and in particular, to an uplink signal sending method and a terminal.

BACKGROUND

When a terminal moves from a cell (source cell) to another cell (target cell), a handover procedure may be triggered. In a time period from handover start to handover completion, the terminal neither sends an uplink signal to the source cell nor starts to send an uplink signal to the target cell, resulting in interruption of uplink signal transmission.

However, an increase in service types, a sharp increase in an amount of service data, and an increase in a moving speed of the terminal have resulted in an increasingly strict requirement on service interruption time and reliability in a handover process. For example, zero or close to zero service transmission interruption is required in a mobile office, a mobile video service, vehicle wireless control, or train wireless control.

Therefore, interruption of uplink signal transmission in the handover process is a problem that needs to be resolved currently and urgently.

SUMMARY

This application provides an uplink signal sending method and a terminal, to resolve a problem of interruption of uplink signal transmission in a handover process.

According to a first aspect, this application provides an uplink signal sending method, applied to handover of a terminal from a source cell to a target cell. The method includes: The terminal determines, according to a symbol puncturing rule, a symbol that needs to be punctured. The terminal sends an uplink signal to the source cell or the target cell based on the determined symbol that needs to be punctured. The symbol puncturing rule is predefined in a protocol, or the symbol puncturing rule is determined after the terminal measures cell-specific reference signals of the source cell and the target cell.

Based on the foregoing solution, in a process in which the terminal is handed over from the source cell to the target cell, the terminal sends the uplink signals to the source cell and the target cell in a time division manner, thereby resolving a problem of interruption of uplink signal transmission. In addition, there may be an overlapping symbol when the uplink signals are sent to the source cell and the target cell in the time division manner. To be specific, the terminal not only expects to send the uplink signal to the target cell by using the symbol, but also expects to send the uplink signal to the source cell by using the symbol. For this problem, in this solution, the terminal may determine the symbol that needs to be punctured, and send the uplink signal based on the symbol that needs to be punctured, so that conflicting use of the overlapping symbol is avoided.

In a possible implementation, the symbol puncturing rule is determined after the terminal measures the cell-specific reference signals of the source cell and the target cell. In this case, that the terminal determines, according to a symbol puncturing rule, a symbol that needs to be punctured includes: The terminal measures the cell-specific reference signal sent by the source cell, to obtain a first measurement result, and measures the cell-specific reference signal sent by the target cell, to obtain a second measurement result. The terminal determines, based on the first measurement result and the second measurement result, the symbol that needs to be punctured.

In a possible implementation, that the terminal determines, based on the first measurement result and the second measurement result, the symbol that needs to be punctured includes: The terminal determines, based on the first measurement result and the second measurement result, that the symbol that needs to be punctured is a symbol used to send the uplink signal to the source cell or a symbol used to send the uplink signal to the target cell, where the symbol that needs to be punctured is an overlapping symbol between the symbol used to send the uplink signal to the source cell and the symbol used to send the uplink signal to the target cell.

In a possible implementation, the first measurement result includes power that is of the cell-specific reference signal sent by the source cell and that is measured by the terminal, and the second measurement result includes power that is of the cell-specific reference signal sent by the target cell and that is measured by the terminal.

Alternatively, the first measurement result includes quality that is of the cell-specific reference signal sent by the source cell and that is measured by the terminal, and the second measurement result includes quality that is of the cell-specific reference signal sent by the target cell and that is measured by the terminal.

In a possible implementation, that the terminal sends the uplink signal based on the symbol that needs to be punctured includes: If the symbol that needs to be punctured is the symbol used to send the uplink signal to the source cell, the terminal sends the uplink signal to the target cell on the symbol that needs to be punctured.

Alternatively, if the symbol that needs to be punctured is the symbol used to send the uplink signal to the target cell, the terminal sends the uplink signal to the source cell on the symbol that needs to be punctured.

In a possible implementation, the terminal further sends a first capability indication to the source cell. The first capability indication is used to indicate that the terminal supports time division handover.

In a possible implementation, the terminal further receives a first enabling indication from the source cell. The first enabling indication is used to indicate to enable time division handover of the terminal.

In a possible implementation, the terminal further sends a second capability indication to the source cell. The second capability indication is used to indicate that the terminal supports puncturing of the overlapping symbol.

In a possible implementation, the terminal further receives a second enabling indication from the source cell. The second enabling indication is used to indicate to enable the terminal to puncture the overlapping symbol.

In a possible implementation, the terminal further sends a first notification indication to the source cell. The first notification indication includes a symbol indication and/or a station indication. The symbol indication is used to indicate the symbol that needs to be punctured and/or a quantity of symbols, where the symbol that needs to be punctured and the quantity of symbols are determined by the terminal. The station indication is used to indicate a station to which the symbol that needs to be punctured and that is determined by the terminal belongs, where the station is the target cell or the source cell.

In a possible implementation, the terminal further receives a third enabling indication from the source cell. The third enabling indication is used to indicate to enable the terminal to puncture the overlapping symbol.

According to a second aspect, this application provides an uplink signal sending method, applied to handover of a terminal from a source cell to a target cell. The method includes: The terminal receives downlink signals from a first cell in a subframe m−k to a subframe m+t−k of the first cell. The terminal sends uplink signals to a second cell in a subframe n to a subframe n+t−1 of the second cell. The terminal sends uplink feedbacks for the downlink signals in a subframe m+t of the first cell. The first cell is one of the source cell and the target cell, the second cell is the other one of the source cell and the target cell, a subframe m of the first cell corresponds to the subframe n of the second cell in a time sequence, n is an integer greater than 1, m is an integer greater than 1, t is a positive integer, k is a preset positive integer, a value of m−k is nonnegative, a value of m+t−k is nonnegative, and t is less than k.

According to the foregoing solution, in a process in which the terminal is handed over from the source cell to the target cell, when a subframe of the first cell cannot be used to send an uplink feedback for a previously received downlink signal, the terminal may send, to the first cell by using another subframe after the subframe, a plurality of uplink feedbacks for downlink signals previously received in a plurality of subframes of the first cell, thereby avoiding a conflict that occurs when the terminal sends the uplink signals to the first cell and the second cell.

In a possible implementation, the first cell is the source cell, the second cell is the target cell, and the uplink signal sent to the second cell includes a random access preamble.

According to a third aspect, this application provides a communications apparatus. The communications apparatus has a function of implementing behavior of the terminal in the foregoing method embodiments. The function may be implemented by hardware, or may be implemented by hardware executing corresponding software. The hardware or the software includes one or more units or modules corresponding to the foregoing function.

In a possible design, the communications apparatus includes a processor, a memory, a bus, and a communications interface. The memory stores computer-executable instructions. The processor is connected to the memory through the bus. When the communications apparatus runs, the processor executes the computer-executable instructions stored in the memory, so that the communications apparatus performs the uplink signal sending method according to any one of the first aspect or the implementations of the first aspect, or performs the uplink signal sending method according to any one of the second aspect or the implementations of the second aspect. For example, the communications apparatus may be a terminal.

In another possible design, the communications apparatus may alternatively be a chip, for example, a chip of the terminal. The chip includes a processing unit. Optionally, the chip further includes a storage unit. The chip may be configured to perform the uplink signal sending method according to any one of the first aspect or the implementations of the first aspect, or perform the uplink signal sending method according to any one of the second aspect or the implementations of the second aspect.

According to a fourth aspect, this application provides a computer storage medium. The computer storage medium stores computer software instructions used by the foregoing terminal. The computer software instructions include a program designed to perform any one of the foregoing aspects.

According to a fifth aspect, this application provides a computer program product. The computer program product includes computer software instructions. The computer software instructions may be loaded through a processor to implement the procedure of the uplink signal sending method according to any one of the foregoing aspects.

DESCRIPTION OF EMBODIMENTS

To make the objectives, technical solutions, and advantages of this application clearer, the following further describes this application in detail with reference to the accompanying drawings. A specific operation method in a method embodiment may also be used in an apparatus embodiment or a system embodiment. In the descriptions of this application, unless otherwise specified, "a plurality of" means two or more than two.

Mobile communication not only pursues maximization of a capacity, but also needs a broader coverage area. That is, a terminal that moves to anywhere needs to be covered by a wireless network signal. To resolve a problem of a frequency resource limitation, increase a system capacity, and expand a network coverage area, a concept of cellular networking is proposed. In the cellular networking, one network service area is divided into many coverage areas, referred to as cellular cells, with a regular hexagon as a basic geometric pattern. A transmitter with relatively low power serves a cellular cell, and a relatively large quantity of terminals are disposed within a relatively small area. Actually, not all terminals can complete all continuous services in a cellular cell. To ensure service continuity, when a terminal that is being served enters a neighboring cell, in a communications network, a service needs to be handed over to the neighboring cell, so that a communication process is not interrupted.

Handover is a process in which a link carrying communications data is handed over from a cell (or base station) to another cell (or base station) in a mobile communication process to ensure that communication is not interrupted.

Figure 1A:
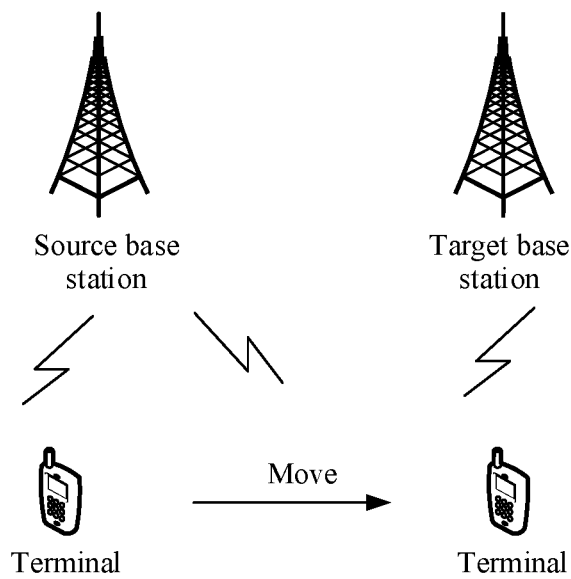
FIG. 1A shows an application scenario to which this application is applicable.

FIG. 1A shows an application scenario to which this application is applicable. Before moving, a terminal accesses a cell (referred to as a source cell) of a source base station. Due to movement of the terminal, the terminal is handed over to another cell (referred to as a target cell), and a base station (referred to as a target base station) of the target cell is different from the source base station. That is, a source base station of a source cell accessed by UE before moving is different from a target base station of a target cell to which the UE is handed over after moving. The terminal communicates with the source base station and the target base station by using a wireless interface.

Figure 1B:
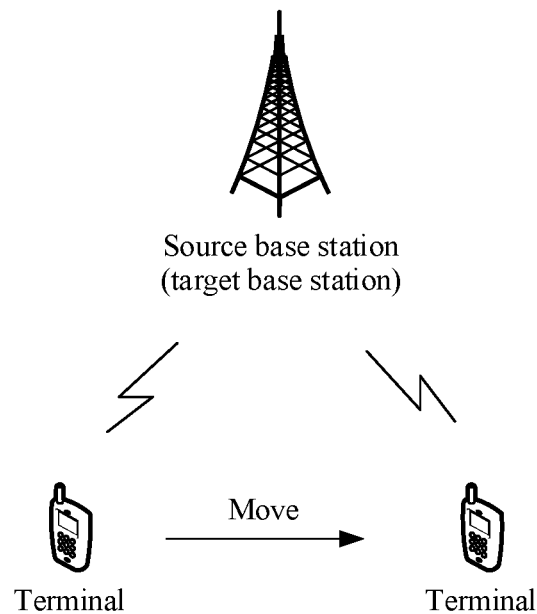
FIG. 1B shows another application scenario to which this application is applicable.

FIG. 1B shows another application scenario to which this application is applicable. Before moving, a terminal accesses a cell (referred to as a source cell) of a source base station. Due to movement of the terminal, the terminal is handed over to another cell (referred to as a target cell), and a base station (referred to as a target base station) of the target cell is the same as the source base station. That is, a source base station of a source cell accessed by UE before moving is the same as a target base station of a target cell to which the UE is handed over after moving. The terminal communicates with the source base station (target base station) by using a wireless interface.

In this application, the terminal is a device having a wireless transceiver function. The terminal may be deployed on land, including an indoor device, an outdoor device, a handheld device, or a vehicle-mounted device, or may be deployed on water (for example, on a ship), or may be deployed in the air (for example, on an aircraft, a balloon, and a satellite). The terminal may be a mobile phone, a tablet computer (pad), a computer having a wireless transceiver function, a virtual reality (VR) terminal, an augmented reality (AR) terminal, a wireless terminal in industrial control, a wireless terminal in self driving, a wireless terminal in telemedicine, a wireless terminal in a smart grid, a wireless terminal in transportation safety, a wireless terminal in a smart city, or a wireless terminal in a smart home, and may further include user equipment (UE) and the like.

In this application, a base station, for example, the source base station or the target base station, is a device that provides a wireless communication function for the terminal. For example, the base station includes but is not limited to: a next-generation base station (gNB) in 5G, an evolved NodeB (eNB), a radio network controller (RNC), a NodeB (NB), a base station controller (BSC), a base transceiver station (BTS), a home base station, a baseband unit (BBU), a transmission point (TRP), a transmission point (TP), a mobile switching center, and the like.

It should be noted that, in this application, a "handover" scenario is sometimes referred to as a scenario in which the terminal is handed over from the source cell to the target cell or a scenario in which the terminal is handed over from the source base station to the target base station. The two scenarios have a same meaning, and are alternately used in this application. This is uniformly described herein. In addition, in this application, the "handover" scenario is sometimes referred to as a scenario in which the terminal receives information (for example, a downlink signal) from the source base station/target base station and sends information (for example, an uplink signal) to the source base station/target base station or a scenario in which the terminal receives information (for example, a downlink signal) from the source cell/target cell and sends information (for example, an uplink signal) to the source cell/target cell. The two scenarios have a same meaning, and are alternately used in this application. This is uniformly described herein.

In other words, in this application, the source base station and the source cell have a same meaning, and the target base station and the target cell have a same meaning.

An increase in service types, a sharp increase in an amount of service data, and an increase in a moving speed of the terminal have resulted in an increasingly strict requirement on service interruption time and reliability in a handover process. For example, zero service transmission interruption is required in a mobile office, a mobile video service, vehicle wireless control, or train wireless control.

In a current technology, in a procedure in which the terminal is handed over from the source base station to the target base station, after receiving a handover command (HO command) from the source base station, the terminal stops uplink (UL) sending to the source base station, starts to search for the target base station, and performs time and frequency synchronization with the target base station. Then, the terminal initiates a random access (Random access) process to the target base station. In the random access process, the terminal obtains an occasion on which a random access preamble is sent to the target base station, namely, a physical random access channel (PRACH) occasion. When the occasion arrives, the terminal sends a preamble (denoted as a message 1, Msg 1 for short) to the target base station. Then, the terminal listens to a physical downlink control channel (PDCCH) scrambled by a random access radio network temporary identifier (RA-RNTI). The PDCCH is used to schedule a random access response (RAR) message (denoted as a message 2, Msg 2 for short). The RAR message includes an uplink timing advance (TA) and an uplink grant (UL grant). Finally, the terminal sends a handover complete (HO complete) message (denoted as a message 3, Msg 3 for short) to the target base station by using the UL grant and the TA. The handover command may be mobility control information, and is included in a radio resource control (RRC) connection reconfiguration (RRC Connection Reconfiguration) message. The handover complete message may be an RRC connection reconfiguration complete (RRC Connection Reconfiguration Complete) message.

In the foregoing process in which the terminal is handed over from the source base station to the target base station, after receiving the handover command from the source base station, the terminal needs to process the command, and then stops sending an uplink signal to the source base station and stops receiving a downlink signal from the source base station. If the terminal has detected the target cell, and has information such as time synchronization and a cell identifier (cell ID) of the target cell, the terminal does not need to re-perform cell synchronization search. If the terminal does not have the foregoing information of the target cell, or the foregoing information that the terminal has is invalid, the terminal needs to re-perform cell search. The terminal further needs to complete fine time and frequency synchronization with the target cell, namely, fine synchronization obtaining. In addition, the terminal further needs to update related configuration information of a medium access control (MAC) layer and a higher layer, to prepare for receiving data of the target base station. In a scenario in which a random access channel (RACH) procedure needs to be performed, the terminal initiates a RACH process. After receiving the Msg 3, the terminal may start to send an uplink signal to the target base station, and receive a downlink signal from the target base station.

In the foregoing process, processing of the handover command, cell search, fine synchronization, update of a MAC layer/higher layer parameter, and the RACH process all result in interruption of uplink and downlink signal transmission, namely, interruption of data transmission in a cell handover process. In other words, in a time period from handover start to handover completion, the terminal neither sends the uplink signal to the source base station nor receives the downlink signal from the source base station. In addition, the terminal neither sends the uplink signal to the target base station nor receives the downlink signal from the target base station. The interruption of data transmission includes interruption of uplink signal transmission and interruption of downlink signal transmission.

For the foregoing problem of interruption of uplink signal transmission, in a current technology, a time division handover method is provided. In the method, a terminal is required to send uplink signals to a source cell (source base station) and a target cell (target base station) in a time division manner, that is, send the uplink signal to the source cell in a time period T1, send the uplink signal to the target cell in a time period T2 after the time period T1, then send the uplink signal to the source cell in a time period T3 after the time period T2, and so on.

The time division handover method mainly has the following two problems.

First, because timings at which the terminal sends the uplink signals to the two cells are different, overlapping may occur at a subframe boundary during alternation. To be specific, at an overlapping location, the terminal not only expects to send the uplink signal to the source cell, but also expects to send the uplink signal to the target cell. However, actually, on a same occasion, overlapping duration can only be used to send the uplink signal to the source cell or send the uplink signal to the target cell, thereby affecting uplink signal sending. Therefore, how to deal with overlapping is a problem to be resolved.

Second, sending of an uplink feedback of a downlink signal is affected by using the time division handover method. Usually, an uplink feedback is sent in each uplink subframe. However, due to alternate sending of the uplink signals, an uplink subframe of the source cell or the target cell is unavailable on some occasions. For example, if an uplink subframe is used to send the uplink signal to the source cell, the uplink subframe cannot be used to send the uplink signal to the target cell. For another example, if an uplink subframe is used to send the uplink signal (for example, the uplink feedback of the downlink signal) to the target cell, the uplink subframe cannot be used to send the uplink signal (for example, the uplink feedback of the downlink signal) to the source cell. Therefore, how to specifically design the uplink feedback in the time division handover method is a problem to be resolved.

It should be noted that, in this application, the uplink signal includes but is not limited to uplink data, uplink signaling, an uplink message, and an uplink feedback for a downlink signal, and the downlink signal includes but is not limited to downlink data, downlink signaling, a downlink message, and a downlink feedback for an uplink signal.

Figure 2:
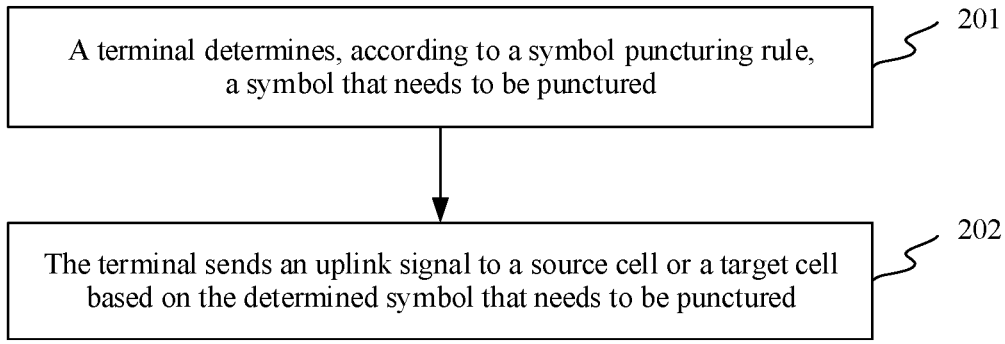
FIG. 2 is a schematic diagram of an uplink signal sending method according to this application.

To resolve the first problem, as shown in FIG. 2, this application provides an uplink signal sending method. The method includes the following steps.

Step 201: A terminal determines, according to a symbol puncturing rule, a symbol that needs to be punctured (puncture).

In an implementation, the symbol puncturing rule is predefined in a protocol. For example, if the terminal is handed over from a source cell to a target cell to send an uplink signal, symbols that need to be punctured are predefined in the protocol as N symbols of the source cell, and the N symbols are overlapping symbols of the source cell and the target cell. For another example, if the terminal is handed over from a source cell to a target cell to send an uplink signal, symbols that need to be punctured are predefined in the protocol as N symbols of the target cell, and the N symbols are overlapping symbols of the source cell and the target cell. For another example, regardless of whether the terminal is handed over from a first cell to a second cell or handed over from a second cell to a first cell to send an uplink signal, symbols that need to be punctured are specified as N symbols of the first cell, and the N symbols are overlapping symbols of the first cell and the second cell. For another example, regardless of whether the terminal is handed over from a first cell to a second cell or handed over from a second cell to a first cell to send an uplink signal, symbols that need to be punctured are predefined in the protocol as N symbols of the second cell, and the N symbols are overlapping symbols of the first cell and the second cell.

In another implementation, the symbol puncturing rule is determined after the terminal measures cell-specific reference signals of the source cell and the target cell. For example, the terminal may determine, according to the following method steps, the symbol that needs to be punctured.

Step A: The terminal measures the cell-specific reference signal sent by the source cell, to obtain a first measurement result, and measures the cell-specific reference signal sent by the target cell, to obtain a second measurement result.

The first measurement result may be denoted as Ms, and the second measurement result may be denoted as Mt.

In an implementation, the first measurement result includes power that is of the cell-specific reference signal sent by the source cell and that is measured by the terminal, and the second measurement result includes power that is of the cell-specific reference signal sent by the target cell and that is measured by the terminal. That is, the terminal separately measures the cell-specific reference signals of the source cell and the target cell, to obtain measured power. The "power" herein may be, for example, reference signal received power (RSRP).

In another implementation, the first measurement result includes quality that is of the cell-specific reference signal sent by the source cell and that is measured by the terminal, and the second measurement result includes quality that is of the cell-specific reference signal sent by the target cell and that is measured by the terminal. That is, the terminal separately measures the cell-specific reference signals of the source cell and the target cell, to obtain measured quality. The "quality" herein may be, for example, reference signal received quality (RSRQ), a channel quality indicator (CQI), a signal to interference plus noise ratio (SINR), or a signal-to-noise ratio (SNR).

Step B: The terminal determines, based on the first measurement result and the second measurement result, the symbol that needs to be punctured.

The terminal determines, based on the first measurement result and the second measurement result, that the symbol that needs to be punctured is a symbol used to send the uplink signal to the source cell or a symbol used to send the uplink signal to the target cell, where the symbol that needs to be punctured is an overlapping symbol between the symbol used to send the uplink signal to the source cell and the symbol used to send the uplink signal to the target cell.

In an implementation, if Ms−Mt≥Threshold 1, the terminal determines that the symbol that needs to be punctured is the symbol used to send the uplink signal to the source cell; or if Ms−Mt<Threshold 1, the terminal determines that the symbol that needs to be punctured is the symbol used to send the uplink signal to the target cell, where the symbol that needs to be punctured is the overlapping symbol between the symbol used to send the uplink signal to the source cell and the symbol used to send the uplink signal to the target cell. A preset threshold (Threshold 1) may be a positive number, a negative number, or zero.

In another implementation, if Ms−Mt≥Threshold 2, the terminal determines that the symbol that needs to be punctured is the symbol used to send the uplink signal to the target cell; or if Ms−Mt<Threshold 2, the terminal determines that the symbol that needs to be punctured is the symbol used to send the uplink signal to the source cell, where the symbol that needs to be punctured is the overlapping symbol between the symbol used to send the uplink signal to the source cell and the symbol used to send the uplink signal to the target cell. A preset threshold (Threshold 2) may be a positive number, a negative number, or zero.

In another implementation, if Mt−Ms≥Threshold 3, the terminal determines that the symbol that needs to be punctured is the symbol used to send the uplink signal to the source cell; or if Mt−Ms<Threshold 3, the terminal determines that the symbol that needs to be punctured is the symbol used to send the uplink signal to the target cell, where the symbol that needs to be punctured is the overlapping symbol between the symbol used to send the uplink signal to the source cell and the symbol used to send the uplink signal to the target cell. A preset threshold (Threshold 3) may be a positive number, a negative number, or zero.

In another implementation, if Mt−Ms≥Threshold 4, the terminal determines that the symbol that needs to be punctured is the symbol used to send the uplink signal to the target cell; or if Mt−Ms<Threshold 4, the terminal determines that the symbol that needs to be punctured is the symbol used to send the uplink signal to the source cell, where the symbol that needs to be punctured is the overlapping symbol between the symbol used to send the uplink signal to the source cell and the symbol used to send the uplink signal to the target cell. A preset threshold (Threshold 4) may be a positive number, a negative number, or zero.

The symbol that needs to be punctured is determined for the terminal by using step A and step B.

Optionally, the terminal may further send a first capability indication to the source cell. The first capability indication is used to indicate that the terminal supports time division handover. In this way, a source base station learns that the terminal supports time division handover. The supporting time division handover is supporting alternate sending of the uplink signal to the source cell or the target cell in a time division handover manner.

Optionally, the source cell may further send a first enabling indication to the terminal. The first enabling indication is used to indicate to enable time division handover of the terminal. In this way, the terminal can enable a function of time division handover based on the first enabling indication.

Optionally, the terminal may further send a second capability indication to the source cell. The second capability indication is used to indicate that the terminal supports puncturing of the overlapping (overlap) symbol. In this way, the source base station learns that the terminal supports puncturing of the overlapping symbol.

Optionally, the source cell may further send a second enabling indication to the terminal. The second enabling indication is used to indicate to enable the terminal to puncture the overlapping symbol. In this way, the terminal can enable, based on the second enabling indication, a function of puncturing the overlapping symbol.

Optionally, the terminal may further send a first notification indication to the source cell. The first notification indication includes a symbol indication and/or a station indication. The symbol indication is used to indicate the symbol that needs to be punctured and/or a quantity of symbols, where the symbol that needs to be punctured and the quantity of symbols are determined by the terminal. The station indication is used to indicate a station to which the symbol that needs to be punctured and that is determined by the terminal belongs, where the station is the target cell or the source cell. In this way, the source cell can learn that the symbol that needs to be punctured and that is determined by the terminal is the symbol used to send the uplink signal to the target cell, and learn of a station whose symbol needs to be punctured.

Optionally, if the source cell receives the first notification indication, the source cell may further send a third enabling indication to the terminal. The third enabling indication is used to indicate to enable the terminal to puncture the overlapping symbol. It should be noted that only one of the third enabling indication and the second enabling indication needs to be sent. A difference between the third enabling indication and the second enabling indication is that sending of the third enabling indication may be triggered by the first notification indication.

Optionally, if the source cell learns, based on the first notification indication, that the symbol that needs to be punctured is the symbol used to send the uplink signal to the target cell, the source cell may further send a second notification indication to the target cell. The second notification indication is used to: indicate the symbol that needs to be punctured and that is determined by the terminal, and indicate that the symbol used to send the uplink signal to the target cell needs to be punctured.

Step 202: The terminal sends the uplink signal to the source cell or the target cell based on the determined symbol that needs to be punctured.

For example, if the symbol that needs to be punctured is the symbol used to send the uplink signal to the source cell, and the symbol that needs to be punctured is the overlapping symbol between the symbol used to send the uplink signal to the source cell and the symbol used to send the uplink signal to the target cell, the sending the uplink signal means that the terminal sends the uplink signal to the target cell on the punctured symbol, that is, the punctured symbol is not used to send the uplink signal to the source cell.

For another example, if the symbol that needs to be punctured is the symbol used to send the uplink signal to the target cell, and the symbol that needs to be punctured is the overlapping symbol between the symbol used to send the uplink signal to the source cell and the symbol used to send the uplink signal to the target cell, the sending the uplink signal means that the terminal sends the uplink signal to the source cell on the punctured symbol, that is, the punctured symbol is not used to send the uplink signal to the target cell.

According to the foregoing method, in a process in which the terminal is handed over from the source cell to the target cell, the terminal sends the uplink signals to the source cell and the target cell in a time division manner, thereby resolving a problem of interruption of uplink signal transmission. In addition, there may be an overlapping symbol when the uplink signals are sent to the source cell and the target cell in the time division manner. To be specific, the terminal not only expects to send the uplink signal to the target cell by using the symbol, but also expects to send the uplink signal to the source cell by using the symbol. For this problem, in this solution, the terminal may determine the symbol that needs to be punctured, and send the uplink signal based on the symbol that needs to be punctured, so that conflicting use of the overlapping symbol is avoided. Further, the terminal may notify the source cell and/or the target cell of the symbol that needs to be punctured, so that the source cell or the target cell improves, according to a notification indication, decoding on the uplink signal sent by the terminal.

Figure 3:
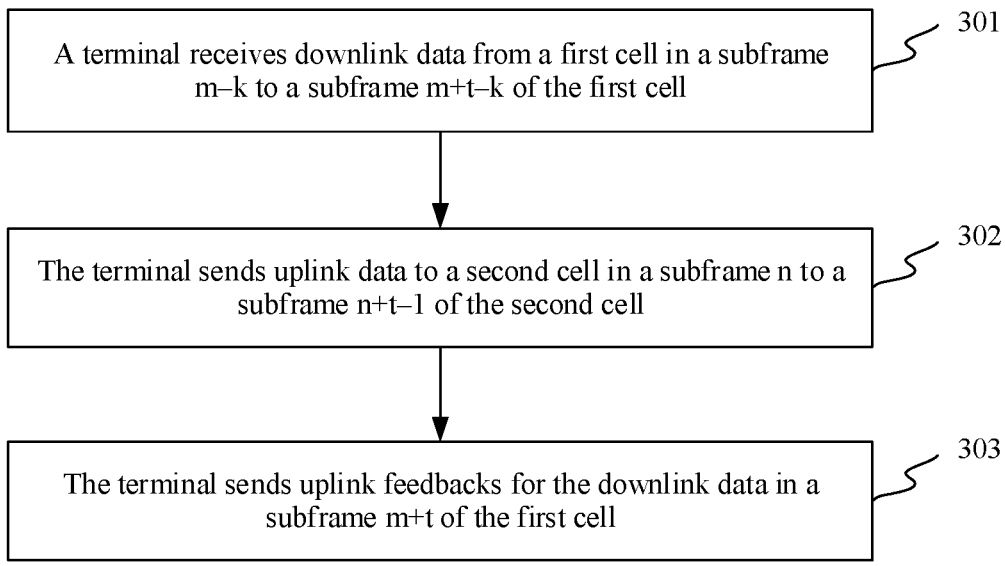
FIG. 3 is a schematic diagram of an uplink signal sending method according to this application.

To resolve the second problem in the current technology, as shown in FIG. 3, this application provides an uplink signal sending method. The method includes the following steps.

Step 301: A terminal receives downlink signals from a first cell in a subframe m−k to a subframe m+t−k of the first cell.

Step 302: The terminal sends uplink signals to a second cell in a subframe n to a subframe n+t−1 of the second cell.

Step 303: The terminal sends uplink feedbacks for the downlink signals in a subframe m+t of the first cell.

The first cell is a source cell, and the second cell is a target cell. Alternatively, the first cell is a target cell, and the second cell is a source cell. In addition, a subframe m of the first cell corresponds to the subframe n of the second cell in a time sequence. The "corresponds to" herein means that a boundary of the subframe m of the first cell is aligned with a boundary of the subframe n of the second cell, or a boundary of the subframe m of the first cell is slightly staggered from a boundary of the subframe n of the second cell. For example, staggered duration is less than 0.5 ms.

The "uplink feedback" herein is a feedback for the received downlink signal, where the feedback is sent on an uplink symbol. For example, the uplink feedback may be a HARQ-ACK or a hybrid automatic repeat request negative acknowledgment (HARQ-NACK).

In the foregoing steps, n and m are integers greater than 1, t is a positive integer, k is a preset positive integer, values of m−k and m+t−k are both nonnegative, and t is less than k.

Herein, for k, the terminal receives a downlink signal of a cell (for example, the source cell or the target cell) in a subframe (for example, a subframe p), and sends, after processing the downlink signal for a period of time, an uplink feedback for the downlink signal to the cell in a subframe p+k. Therefore, k may be understood as a time period required by the terminal to process the downlink signal.

The following provides explained descriptions for the foregoing steps.

In step 301, the terminal receives the downlink signals of the first cell in the subframe m−k to the subframe m+t−k of the first cell. Therefore, according to normal processing, the terminal needs to send, to the first cell in the subframe m of the first cell, an uplink feedback for a downlink signal, of the first cell, received in the subframe m−k, send, to the first cell in a subframe m+1 of the first cell, an uplink feedback for a downlink signal, of the first cell, received in a subframe m+1−k, . . . , and send, to the first cell in the subframe m+t of the first cell, an uplink feedback for a downlink signal, of the first cell, received in the subframe m+t−k.

Subframes n, n+1, n+2, n+3, and the like of the first cell respectively correspond to subframes m, m+1, m+2, m+3, and the like of the second cell. Therefore, if the terminal sends an uplink signal to the first cell in the subframe n of the first cell, the terminal cannot send an uplink signal to the second cell in the subframe m of the second cell. On the contrary, if the terminal sends an uplink signal to the second cell in the subframe m of the second cell, the terminal cannot send an uplink signal to the first cell in the subframe n of the first cell. A same rule applies to the subframe n+1 and the subframe m+1, the subframe n+2 and the subframe m+2, the subframe n+3 and the subframe m+3, and the like.

In step 302, the terminal sends the uplink signals in the subframe n to the subframe n+t−1 of the second cell. Therefore, the terminal cannot separately send the uplink feedbacks to the first cell by using the subframe m to the subframe m+t−1 of the first cell.

Therefore, in step 303, the terminal sends, to the first cell in the subframe m+t of the first cell, the uplink feedbacks for the downlink signals received from the first cell. The downlink signals herein are downlink signals, of the first cell, received by the terminal in the subframe m−k to the subframe m+t−k of the first cell. The uplink feedbacks herein include the uplink feedback for the downlink signal received in the subframe m−k of the first cell, the uplink feedback for the downlink signal received in the subframe m+1−k of the first cell, . . . , and the uplink feedback for the downlink signal received in the subframe m+t−k of the first cell.

The following provides descriptions with reference to specific examples. For example, a value of k is 4, and a value of t is 1.

The terminal receives downlink signals in a subframe m−4 and a subframe m−3 of the first cell. According to normal processing, the terminal needs to send, to the first cell in the subframe m of the first cell, an uplink feedback for the downlink signal received in the subframe m−4, and send, to the first cell in the subframe m+1 of the first cell, an uplink feedback for the downlink signal received in the subframe m−3.

Because the terminal sends the uplink signal to the second cell in the subframe n of the second cell, the subframe m of the first cell cannot be used to send the uplink feedback to the first cell, that is, the uplink feedback for the downlink signal received in the subframe m−4 cannot be sent in the subframe m.

Therefore, in this application, the uplink feedback for the downlink signal received in the subframe m−4 and the uplink feedback for the downlink signal received in the subframe m−3 are sent in the subframe m+1. For example, if a HARQ-ACK needs to be fed back in the subframe m−4, and a HARQ-ACK needs to be fed back in the subframe m−3, the HARQ-ACKs are fed back in the subframe m+1. For another example, if a HARQ-NACK needs to be fed back in at least one of the subframe m−4 and the subframe m−3, the HARQ-NACK is fed back in the subframe m+1.

According to the foregoing method, when a subframe of the first cell cannot be used to send an uplink feedback for a previously received downlink signal, the terminal may send, to the first cell by using another subframe after the subframe, a plurality of uplink feedbacks for downlink signals previously received in a plurality of subframes of the first cell, thereby avoiding a conflict that occurs when the terminal sends the uplink signals to the first cell and the second cell.

Figure 4:
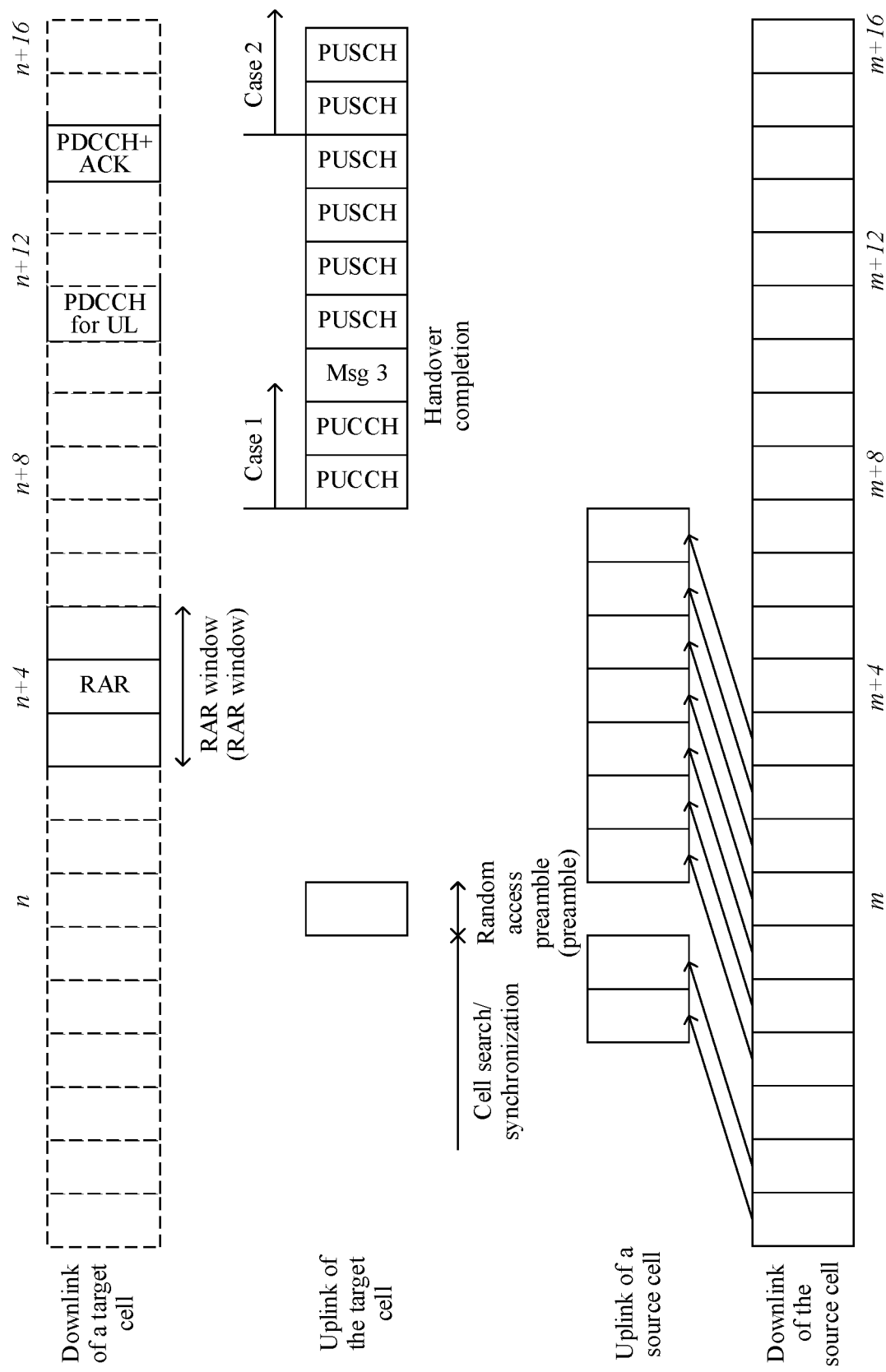
FIG. 4 is an example diagram of sending an uplink signal according to this application.
Figure 5:
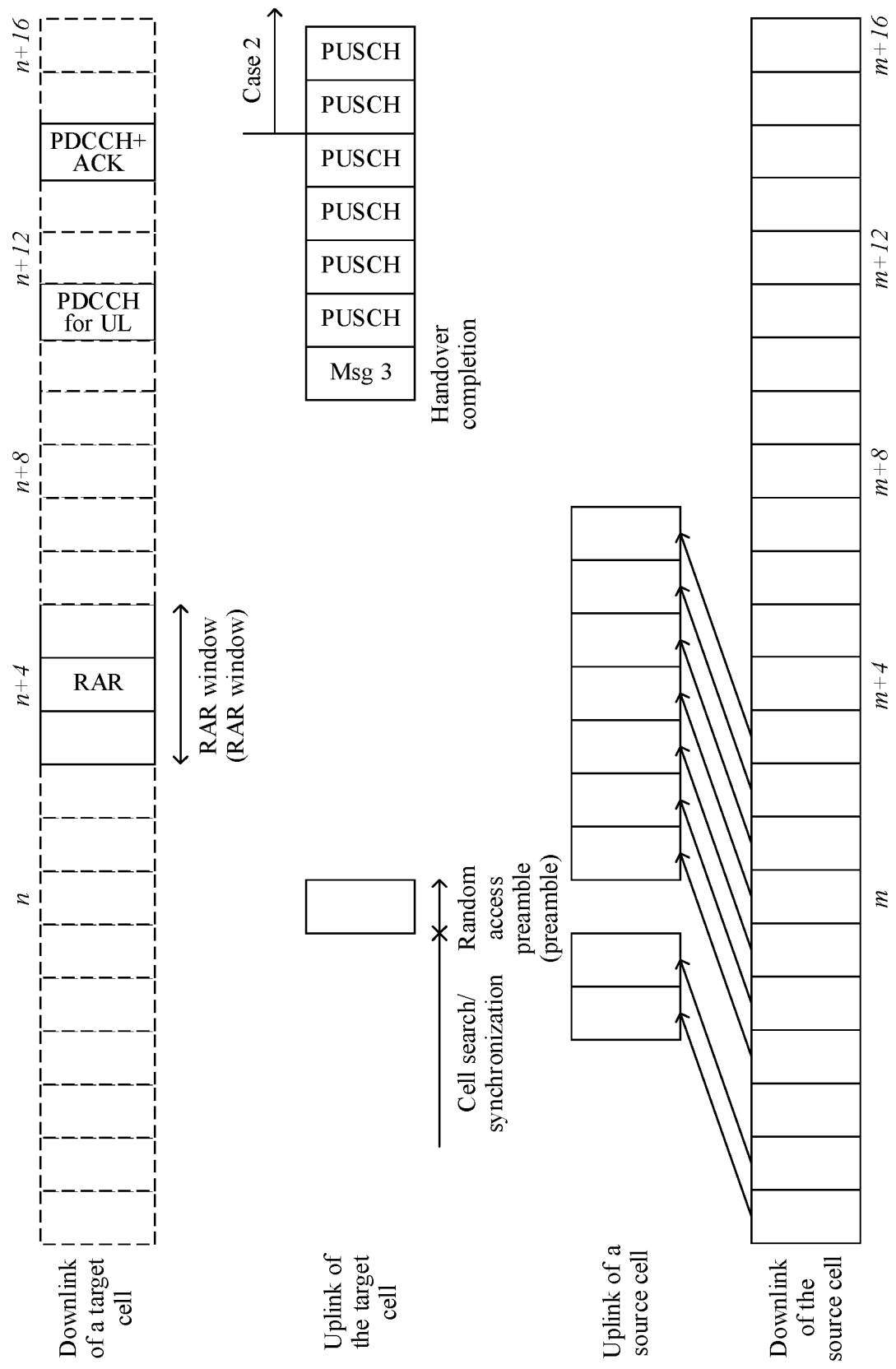
FIG. 5 is another example diagram of sending an uplink signal according to this application.
Figure 6:
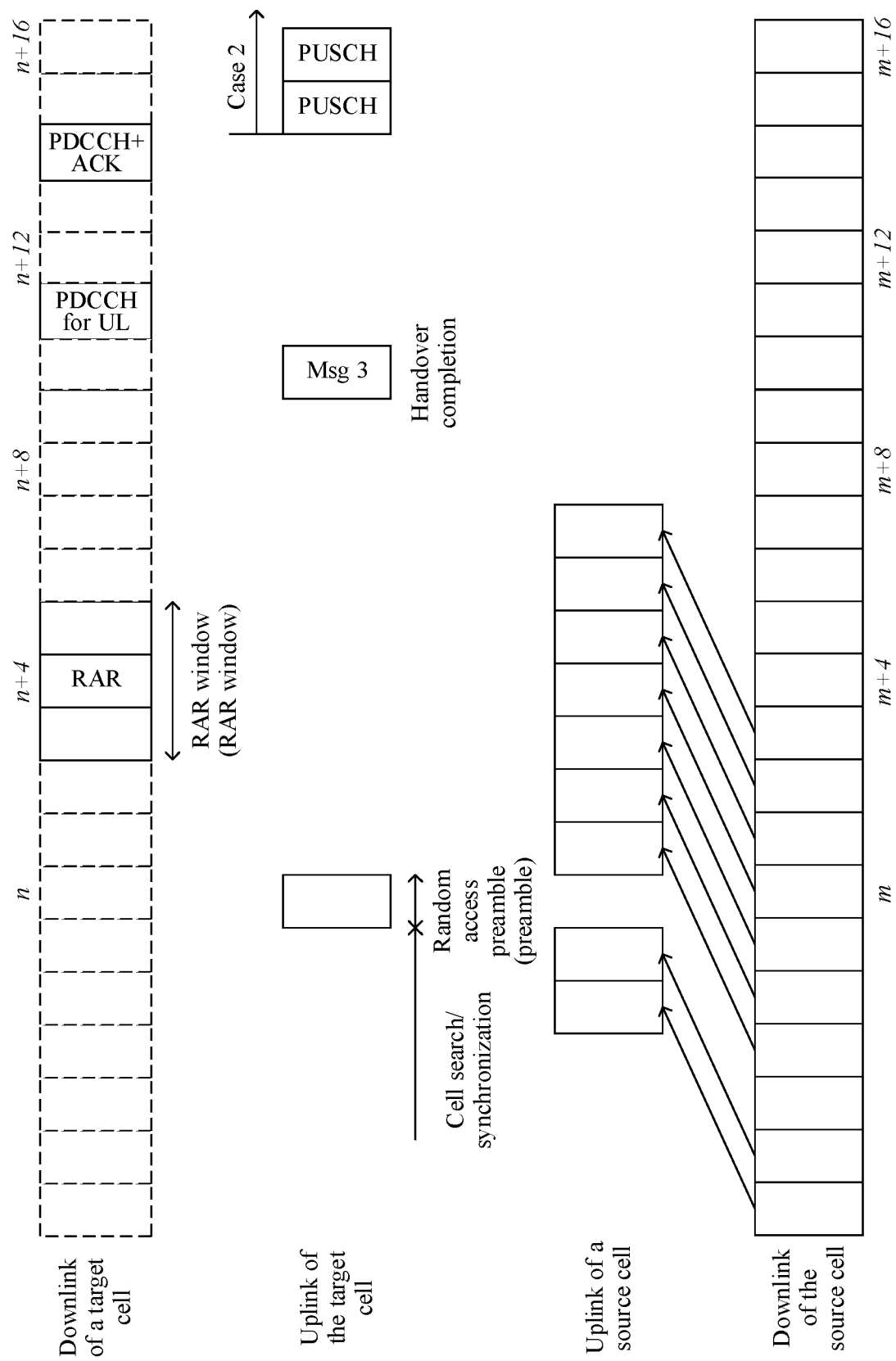
FIG. 6 is another example diagram of sending an uplink signal according to this application.

With reference to specific examples shown in FIG. 4 to FIG. 6, the following describes the uplink signal sending method shown in FIG. 3. In addition, an example in which a value of k is 4, a value of t is 1, a first cell is a source cell, a second cell is a target cell, and an uplink signal sent by a terminal in a subframe n of the target cell is a random access preamble is used for description.

FIG. 4 is an example diagram of sending an uplink signal according to this application. A terminal is synchronized with a subframe n of a target cell on an occasion on which the terminal is synchronized with a subframe m of a source cell. A boundary of the subframe m of the source cell may be aligned with a boundary of the subframe n of the target cell, or a boundary of the subframe m of the source cell may be slightly staggered from a boundary of the subframe n of the target cell.

Step A1: The terminal obtains a downlink synchronization and random access opportunity of the target cell before the subframe n, and sends a preamble to the target cell in the subframe n.

Step A2: The terminal sends a HARQ-ACK/NACK feedback of a downlink signal to the source cell in a subframe m+1.

For example, the feedback is a result of a logical "AND" operation on HARQ-ACKs/NACKs for downlink signals received in a subframe m−4 and a subframe m−3. That is, the HARQ-ACK is fed back only when feedbacks for the two subframes are both the HARQ-ACK; otherwise, the HARQ-NACK is fed back.

In step A2, because the subframe n of the target cell is used to send the preamble to the target cell, the subframe m of the source cell cannot be used to send the uplink signal, so that the terminal can send the uplink signal to the source cell in the subframe m+1. The uplink signal herein may include an uplink feedback, such as the HARQ-ACK or the HARQ-NACK, for the downlink signal sent by the source cell.

After receiving the downlink signal, the terminal needs a specific time period to process the downlink signal. Herein, an example in which the uplink feedback of the downlink signal is sent at an interval of four subframes is used. For example, if the terminal receives the downlink signal in the subframe m−4 of the source cell, the terminal sends an uplink feedback of the downlink signal to the source cell in the subframe m. For another example, if the terminal receives the downlink signal in the subframe m−3 of the source cell, the terminal sends an uplink feedback of the downlink signal to the source cell in the subframe m+1.

In this embodiment, the terminal cannot send, in the subframe m of the source cell, the uplink feedback of the downlink signal received in the subframe m−4. Therefore, when the terminal sends the uplink feedbacks of the downlink signals in the subframe m+1, on one hand, the terminal may send the uplink feedback of the downlink signal received in the subframe m−3; on the other hand, the terminal may further send the uplink feedback of the downlink signal received in the subframe m−4. That is, the uplink feedbacks sent in the subframe m+1 include the uplink feedback of the downlink signal received in the subframe m−4 and the uplink feedback of the downlink signal received in the subframe m−3. For example, if a HARQ-ACK needs to be fed back in the subframe m−4, and a HARQ-ACK needs to be fed back in the subframe m−3, the HARQ-ACKs are fed back in the subframe m+1. For another example, if a HARQ-NACK needs to be fed back in at least one of the subframe m−4 and the subframe m−3, the HARQ-NACK is fed back in the subframe m+1.

Step A3: The terminal starts to listen to a PDCCH of the target cell in a subframe n+3 of the target cell. When an RAR is received in the target cell, the terminal may configure, activate, or enable a bearer, security, and the like corresponding to the target cell, to prepare for receiving the downlink signal of the target cell.

For example, it is assumed that the RAR is received in a subframe n+4 of the target cell. In this case, the terminal may configure the bearer, the security, and the like corresponding to the target cell, to prepare for receiving the downlink signal of the target cell.

In an example, the target cell starts to send the downlink signal to the terminal in the subframe n+4.

It should be noted that, an example in which the RAR is received in the subframe n+4 is used for description herein, and actually, the RAR may alternatively be received in a subframe n+5.

Step A4: After receiving the RAR, if the terminal receives the downlink signal of the target cell, the terminal sends the uplink feedback of the downlink signal on an activated PUCCH by using a timing advance (TA) carried in the RAR.

For example, if the terminal receives the downlink signal of the target cell after the subframe n+4, the terminal sends the uplink feedback of the downlink signal on the activated PUCCH by using the timing advance (TA) carried in the RAR.

For example, if the terminal receives the downlink signal of the target cell in the subframe n+4, the terminal starts to send the uplink feedback in a subframe n+8. In addition, starting from the subframe, the terminal stops sending the uplink signal to the source cell, that is, cancels the uplink feedback of the downlink signal received from the source cell.

Based on this embodiment, an uplink feedback problem of downlink signal reception of the source cell and an uplink feedback problem of downlink signal reception of the target cell can be resolved. In this embodiment, uplink feedbacks of a plurality of downlink signals of the source cell are bundled and sent (as shown in FIG. 4, the uplink feedbacks sent in the subframe m+1 are the uplink feedback of the downlink signal in the subframe m−3 and the uplink feedback of the downlink signal in the subframe m−4), and the uplink feedback of the downlink signal of the target cell is activated in advance (as shown in FIG. 4, before the Msg 3 is received, the uplink feedback of the downlink signal starts to be sent to the target cell).

FIG. 5 is another example diagram of sending an uplink signal according to this application. A terminal is synchronized with a subframe n of a target cell on an occasion on which the terminal is synchronized with a subframe m of a source cell. A boundary of the subframe m of the source cell may be aligned with a boundary of the subframe n of the target cell, or a boundary of the subframe m of the source cell may be slightly staggered from a boundary of the subframe n of the target cell.

Step B1 and step B2 are the same as step A1 and step A2 in the embodiment shown in FIG. 4. Refer to the foregoing descriptions.

Step B3: The terminal starts to listen to a PDCCH of the target cell in a subframe n+3 of the target cell. When an RAR is received in the target cell, the terminal may configure, activate, or enable a bearer, security, and the like corresponding to the target cell, to prepare for receiving the downlink signal of the target cell.

For example, it is assumed that the RAR is received in a subframe n+4 of the target cell. In this case, the terminal may configure the bearer, the security, and the like corresponding to the target cell, to prepare for receiving the downlink signal of the target cell.

In an example, the target cell starts to send the downlink signal to the terminal in a subframe n+6.

It should be noted that, an example in which the RAR is received in the subframe n+4 is used for description herein, and actually, the RAR may alternatively be received in a subframe n+5.

Step B4: After receiving the RAR, if the terminal receives the downlink signal of the target cell, the terminal sends the uplink feedback of the downlink signal on an activated PUCCH by using a timing advance (TA) carried in the RAR.

For example, if the terminal receives the downlink signal of the target cell after the subframe n+6, the terminal sends the uplink feedback of the downlink signal on the activated PUCCH by using the timing advance (TA) carried in the RAR.

In this example, the uplink feedback of the downlink signal of the target cell is sent in a subframe in which a Msg 3 is transmitted and a subframe after this subframe. For example, if the terminal receives the downlink signal of the target cell in the subframe n+6, the terminal starts to send feedback information in a subframe n+10. Starting from the subframe, the terminal stops sending the uplink signal to the source cell, that is, cancels the uplink feedback of the downlink signal received from the source cell.

Based on this embodiment, an occasion on which the target cell starts to send the downlink signal to the terminal is slightly later than an occasion on which the target cell starts to send the downlink signal to the terminal in the embodiment shown in FIG. 4, and interruption of PUSCH sending in a subframe n+8 and a subframe n+9 is reduced. The terminal performs continuous sending to the source cell until a subframe before the subframe in which the Msg 3 is transmitted.

FIG. 6 is an example diagram of sending an uplink signal according to this application. A terminal is synchronized with a subframe n of a target cell on an occasion on which the terminal is synchronized with a subframe m of a source cell. A boundary of the subframe m of the source cell may be aligned with a boundary of the subframe n of the target cell, or a boundary of the subframe m of the source cell may be slightly staggered from a boundary of the subframe n of the target cell.

Step C1 and step C2 are the same as step A1 and step A2 in the embodiment shown in FIG. 4. Refer to the foregoing descriptions.

Step C3: The terminal starts to listen to a PDCCH of the target cell in a subframe n+3 of the target cell.

For example, it is assumed that an RAR is received in a subframe n+4 of the target cell.

In an example, the target cell starts to send the downlink signal to the terminal in a subframe n+11 after a Msg 3 is received, and starts to perform uplink scheduling on the terminal.

It should be noted that, an example in which the RAR is received in the subframe n+4 is used for description herein, and actually, the RAR may alternatively be received in a subframe n+5.

Step C4: After sending the Msg 3 in the target cell, the terminal sends the uplink signal to the source cell.

Because a subframe m+10 is used to transmit the Msg 3 of the target cell, the subframe m+10 cannot be used to transmit an uplink feedback of a subframe m+6, and both the uplink feedback of the subframe m+6 and an uplink feedback of the subframe m+7 may be sent in a subframe m+11. For a specific implementation process, refer to a processing process of sending the uplink feedbacks in the subframe m+1.

After sending the Msg 3, the terminal listens to the PDCCH of the target cell. If the terminal finds uplink scheduling of the target cell through listening, the terminal stops sending the uplink signal to the source cell, and starts to send an uplink signal to the target cell.

For example, if the terminal receives the downlink signal and uplink scheduling of the target cell in the subframe n+11 of the target cell, the terminal starts to send the uplink feedback of the downlink signal and another uplink signal in a subframe n+15. Starting from the subframe, the terminal stops sending the uplink signal to the source cell, that is, cancels the uplink feedback of the downlink signal received from the source cell.

Based on this embodiment, compared with the embodiments shown in FIG. 4 and FIG. 5, the target cell schedules the terminal to start to send the uplink signal to the target cell only after receiving the Msg 3. This helps avoid a waste caused by blind scheduling. To be specific, after sending the Msg 3, the terminal continues to send the uplink signal to the source cell. The terminal starts to send the uplink signal to the target cell only after finding, through listening, the uplink sending scheduled by the target cell.

Figure 7:
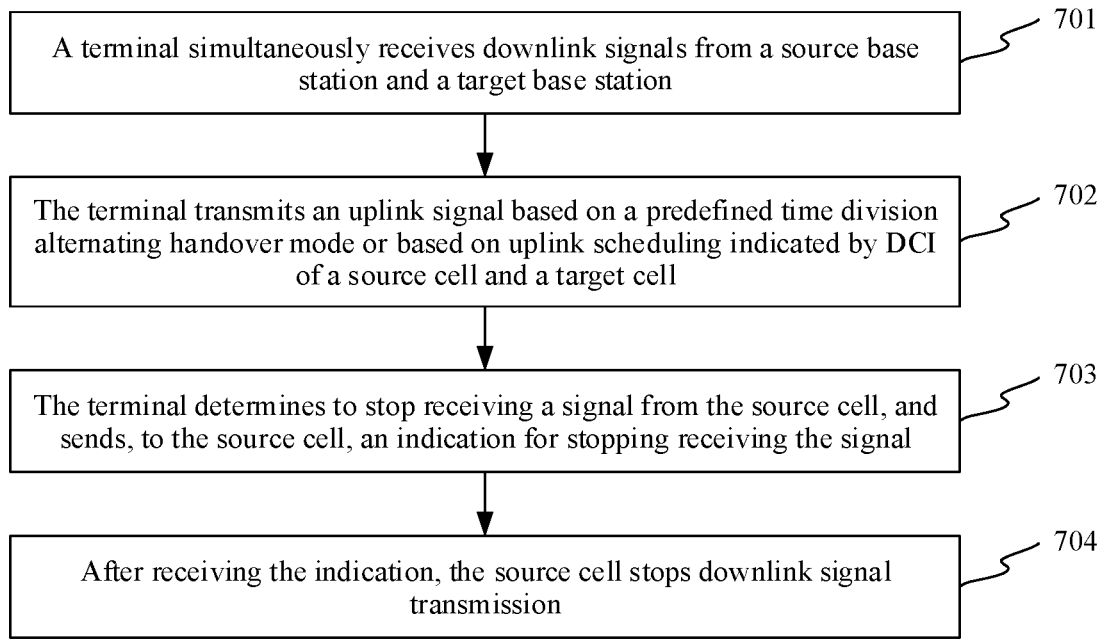
FIG. 7 is a schematic diagram of another uplink signal sending method according to this application.

To resolve the second problem in the current technology, as shown in FIG. 7, this application provides another uplink signal sending method. The method is applied to a process in which a terminal is handed over from a source cell to a target cell.

The method includes the following steps.

Step 701: The terminal simultaneously receives downlink signals from the source cell and the target cell.

Step 702: The terminal transmits an uplink signal based on a predefined time division handover mode or based on uplink scheduling indicated by downlink control information (DCI) of the source cell and the target cell.

Optionally, the time division handover mode includes an uplink sending time point.

Step 703: The terminal determines to stop receiving a signal from the source cell, and sends, to the source cell, an indication for stopping receiving the signal.

Optionally, the indication may be carried in a radio resource control (RRC) message, a media access control control element (MAC CE), or a physical layer message.

Optionally, a condition for determining, by the terminal, to stop receiving the signal from the source cell includes but is not limited to: a configured timer expires, or a downlink signal measurement result (for example, power or quality) of the source cell is lower than a threshold (where the threshold may be configured by a source base station).

In an alternative implementation of step 703, the terminal may alternatively send, to the target cell, an indication for stopping receiving a signal from the source cell, and then the target cell forwards the indication to the source cell.

Step 704: After receiving the indication, the source cell stops downlink signal transmission.

For example, after receiving the indication, the source cell may immediately stop downlink signal transmission.

For another example, after receiving the indication, the source cell may wait for a period of time and then stop downlink signal transmission.

For another example, after receiving the indication, the source cell stops downlink signal transmission after determining that a set condition is met.

According to the foregoing method, the terminal may transmit the uplink signal based on the predefined time division handover mode or based on uplink scheduling indicated by the DCI of the source cell and the target cell, and may further notify the source cell to stop sending the downlink signal.

It should be noted that "first", "second", and "third" in this application are only used to distinguish between different nouns, and do not constitute a limitation on meanings of the nouns.

It may be understood that, in the foregoing method embodiments, the method implemented by the terminal may also be implemented by a component (for example, a chip or a circuit) that can be used in the terminal. This is not limited in the embodiments of this application.

Figure 8:
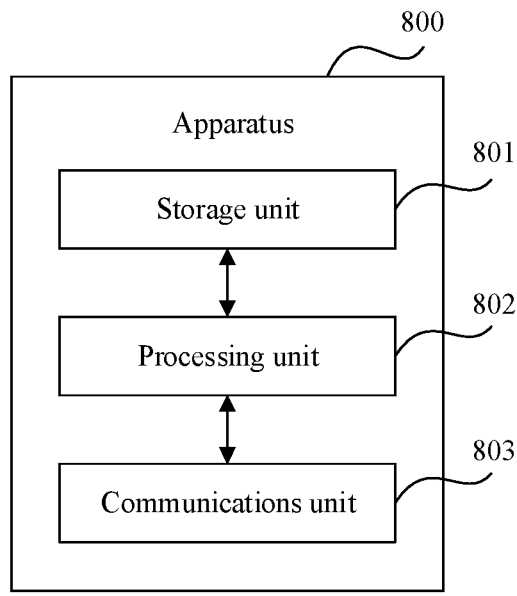
FIG. 8 is a schematic diagram of an apparatus according to this application.

FIG. 8 is a possible example block diagram of an apparatus according to an embodiment of the present invention. The apparatus 800 may exist in a form of software or hardware. The apparatus 800 may include a processing unit 802 and a communications unit 803. In an implementation, the communications unit 803 may include a receiving unit and a sending unit. The processing unit 802 is configured to control and manage an action of the apparatus 800. The communications unit 803 is configured to support the apparatus 800 in communicating with another network entity. The apparatus 800 may further include a storage unit 801, configured to store program code and data that are of the apparatus 800.

The processing unit 802 may be a processor or a controller, such as a general-purpose central processing unit CPU), a general-purpose processor, digital signal processing (DSP), an application-specific integrated circuit (ASIC), a field programmable gate array (FPGA), or another programmable logical device, a transistor logical device, a hardware component, or any combination thereof. The processing unit 802 may implement or execute various example logical blocks, modules, and circuits described with reference to content disclosed in the present invention. The processor may be a combination of processors implementing a computing function, for example, a combination of one or more microprocessors, or a combination of the DSP and a microprocessor. The communications unit 803 may be a communications interface, a transceiver, a transceiver circuit, or the like. The communications interface is a general name, and may include a plurality of interfaces during specific implementation. The storage unit 801 may be a memory.

In an embodiment, the apparatus 800 may be a terminal, or may be a chip in a terminal. The terminal may be configured to implement operations performed by the terminal in the foregoing embodiments. Specifically, an example in which the communications unit 803 includes a sending unit and a receiving unit is used.

In an embodiment, the processing unit is configured to determine, according to a symbol puncturing rule, a symbol that needs to be punctured. The sending unit is configured to send an uplink signal to the source cell or the target cell based on the determined symbol that needs to be punctured. The symbol puncturing rule is predefined in a protocol, or the symbol puncturing rule is determined after the terminal measures cell-specific reference signals of the source cell and the target cell.

In a possible implementation, the symbol puncturing rule is determined after the terminal measures the cell-specific reference signals of the source cell and the target cell. The processing unit is specifically configured to: measure the cell-specific reference signal sent by the source cell, to obtain a first measurement result, and measure the cell-specific reference signal sent by the target cell, to obtain a second measurement result; and determine, based on the first measurement result and the second measurement result, the symbol that needs to be punctured.

In a possible implementation, the processing unit is specifically configured to determine, based on the first measurement result and the second measurement result, that the symbol that needs to be punctured is a symbol used to send the uplink signal to the source cell or a symbol used to send the uplink signal to the target cell, where the symbol that needs to be punctured is an overlapping symbol between the symbol used to send the uplink signal to the source cell and the symbol used to send the uplink signal to the target cell.

In a possible implementation, the first measurement result includes power that is of the cell-specific reference signal sent by the source cell and that is measured by the terminal, and the second measurement result includes power that is of the cell-specific reference signal sent by the target cell and that is measured by the terminal. Alternatively, the first measurement result includes quality that is of the cell-specific reference signal sent by the source cell and that is measured by the terminal, and the second measurement result includes quality that is of the cell-specific reference signal sent by the target cell and that is measured by the terminal.

In a possible implementation, the sending unit is specifically configured to: if the symbol that needs to be punctured is the symbol used to send the uplink signal to the source cell, send the uplink signal to the target cell on the symbol that needs to be punctured; or if the symbol that needs to be punctured is the symbol used to send the uplink signal to the target cell, send the uplink signal to the source cell on the symbol that needs to be punctured.

In a possible implementation, the sending unit is further configured to send a first capability indication to the source cell. The first capability indication is used to indicate that the terminal supports time division handover.

In a possible implementation, the receiving unit is configured to receive a first enabling indication from the source cell. The first enabling indication is used to indicate to enable time division handover of the terminal.

In a possible implementation, the sending unit is further configured to send a second capability indication to the source cell. The second capability indication is used to indicate that the terminal supports puncturing of the overlapping symbol.

In a possible implementation, the receiving unit is configured to receive a second enabling indication from the source cell. The second enabling indication is used to indicate to enable the terminal to puncture the overlapping symbol.

In a possible implementation, the sending unit is further configured to send a first notification indication to the source cell. The first notification indication includes a symbol indication and/or a station indication. The symbol indication is used to indicate the symbol that needs to be punctured and/or a quantity of symbols, where the symbol that needs to be punctured and the quantity of symbols are determined by the terminal. The station indication is used to indicate a station to which the symbol that needs to be punctured and that is determined by the terminal belongs, where the station is the target cell or the source cell.

In a possible implementation, the receiving unit is configured to receive a third enabling indication from the source cell. The third enabling indication is used to indicate to enable the terminal to puncture the overlapping symbol.

In another example, the receiving unit is configured to receive downlink signals from a first cell in a subframe m–k to a subframe m+t–k of the first cell. The sending unit is configured to: send uplink signals to a second cell in a subframe n to a subframe n+t−1 of the second cell; and send uplink feedbacks for the downlink signals in a subframe m+t of the first cell. The first cell is one of the source cell and the target cell, the second cell is the other one of the source cell and the target cell, a subframe m of the first cell corresponds to the subframe n of the second cell in a time sequence, n is an integer greater than 1, m is an integer greater than 1, t is a positive integer, k is a preset positive integer, a value of m−k is nonnegative, a value of m+t−k is nonnegative, and t is less than k.

In a possible implementation, the first cell is the source cell, the second cell is the target cell, and the uplink signal sent to the second cell includes a random access preamble.

When the apparatus shown in FIG. 8 is a terminal, for specific beneficial effects of the uplink signal sending method performed by the terminal, refer to related descriptions in the foregoing method embodiments. Details are not described herein again. It may be understood that the units in this embodiment of this application may also be referred to as modules. The foregoing units or modules may exist independently, or may be integrated together.

Figure 9:
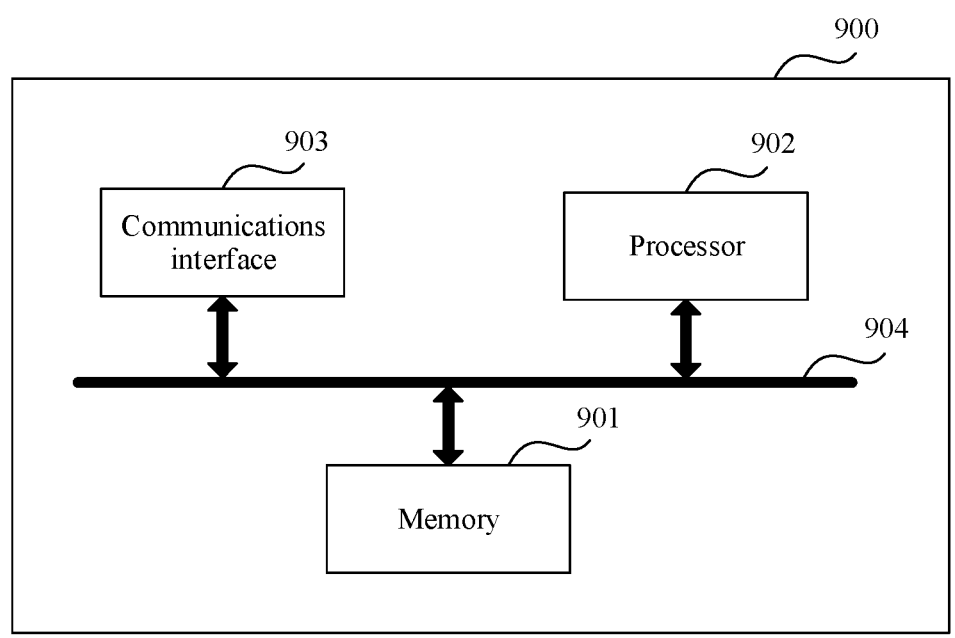
FIG. 9 is a schematic diagram of another apparatus according to this application.

FIG. 9 is a schematic diagram of an apparatus according to this application. The apparatus may be a terminal in the embodiments of this application, or may be a component that can be used for a terminal. The apparatus 900 includes a processor 902, a communications interface 903, and a memory 901. Optionally, the apparatus 900 may further include a bus 904. The communications interface 903, the processor 902, and the memory 901 may be connected to each other by using a communications line 904. The communications line 904 may be a peripheral component interconnect (PCI) bus, an extended industry standard architecture (EISA) bus, or the like. The communications line 904 may be classified into an address bus, a data bus, a control bus, and the like. For ease of representation, only one thick line is used to represent the bus in FIG. 9, but this does not mean that there is only one bus or only one type of bus.

The processor 902 may be a CPU, a microprocessor, an ASIC, or one or more integrated circuits configured to control program execution in the solutions of this application.

The communications interface 903 may be any type of apparatus using a transceiver, and is configured to communicate with another device or a communications network such as the ethernet, a radio access network (RAN), a wireless local area network (WLAN), or a wired access network.

The memory 901 may be a read-only memory ROM), another type of static storage device that can store static information and instructions, a random access memory (RAM), or another type of dynamic storage device that can store information and instructions, or may be an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray disc, and the like), a magnetic disk storage medium or another magnetic storage device, or any other medium that can be configured to carry or store expected program code in a form of instructions or a data structure and that can be accessed by a computer. However, the memory 901 is not limited thereto. The memory may exist independently, and is connected to the processor by using the communications line 904. Alternatively, the memory may be integrated with the processor.

The memory 901 is configured to store computer-executable instructions for executing the solutions in this application, and the processor 902 controls the execution of the computer-executable instructions. The processor 902 is configured to execute the computer-executable instructions stored in the memory 901, to implement the uplink signal sending method according to the foregoing embodiments of this application.

Optionally, the computer-executable instructions in the embodiments of this application may also be referred to as application program code. This is not specifically limited in this embodiment of this application.

All or some of the foregoing embodiments may be implemented by using software, hardware, firmware, or any combination thereof. When software is used for implementation, all or some of the embodiments may be implemented in a form of a computer program product. The computer program product includes one or more computer instructions. When the computer program instructions are loaded and executed on a computer, all or some of the procedures or functions according to the embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

The various illustrative logical units and circuits described in the embodiments of this application may implement or operate the described functions through a general-purpose processor, a digital signal processor, an application-specific integrated circuit (ASIC), a field programmable gate array (FPGA) or another programmable logical apparatus, a discrete gate or transistor logic, a discrete hardware component, or a design of any combination thereof. The general-purpose processor may be a microprocessor. Optionally, the general-purpose processor may alternatively be any conventional processor, controller, microcontroller, or state machine. The processor may alternatively be implemented by a combination of computing apparatuses, such as a digital signal processor and a microprocessor, a plurality of microprocessors, one or more microprocessors in combination with a digital signal processor core, or any other similar configuration.

Steps of the methods or algorithms described in the embodiments of this application may be directly embedded into hardware, a software unit executed by a processor, or a combination thereof. The software unit may be stored in a RAM memory, a flash memory, a ROM memory, an EPROM memory, an EEPROM memory, a register, a hard disk, a removable magnetic disk, a CD-ROM, or a storage medium of any other form in the art. For example, the storage medium may be connected to the processor, so that the processor can read information from the storage medium and write information to the storage medium. Optionally, the storage medium may alternatively be integrated into the processor. The processor and the storage medium may be disposed in an ASIC, and the ASIC may be disposed in a terminal. Optionally, the processor and the storage medium may alternatively be disposed in different components of a terminal.

The computer program instructions may alternatively be loaded onto a computer or another programmable data processing device, so that a series of operations and steps are performed on the computer or another programmable device, to generate computer-implemented processing. Therefore, the instructions executed on the computer or the another programmable device provide steps for implementing a specified function in one or more procedures in the flowcharts and/or in one or more blocks in the block diagrams.

Although this application is described with reference to specific features and the embodiments thereof, it is clear that various modifications and combinations may be made to this application without departing from the scope of this application. Correspondingly, the specification and the accompanying drawings are merely example descriptions of this application defined by the appended claims, and are intended to cover any of or all modifications, variations, combinations, or equivalents within the scope of this application. It is clear that a person skilled in the art can make various modifications and variations to this application without departing from the scope of this application. This application is intended to cover these modifications and variations of this application provided that they fall within the scope of the claims of this application and their equivalent technologies.

What is claimed is:

1. An uplink signal sending method, applied to handover of a terminal from a source cell to a target cell, wherein the method comprises:
determining, by the terminal according to a symbol puncturing rule, a symbol that needs to be punctured, wherein the symbol that needs to be punctured is an overlapping symbol between a symbol used to send the uplink signal to the source cell and a symbol used to send the uplink signal to the target cell; and
sending, by the terminal, the uplink signal to the target cell based on the symbol that needs to be punctured, wherein the symbol puncturing rule is predefined in a protocol.

2. The method according to claim 1, wherein the method further comprises:
sending, by the terminal, a first capability indication to the source cell, wherein the first capability indication is used to indicate that the terminal supports time division handover.

3. The method according to claim 2, wherein the method further comprises:
receiving, by the terminal, a first enabling indication from the source cell, wherein the first enabling indication is used to indicate to enable time division handover of the terminal.

4. The method according to claim 1, wherein the method further comprises:
sending, by the terminal, a second capability indication to the source cell, wherein the second capability indication is used to indicate that the terminal supports puncturing of the overlapping symbol.

5. The method according to claim 4, wherein the method further comprises:
receiving, by the terminal, a second enabling indication from the source cell, wherein the second enabling indication is used to indicate that the terminal is enabled to puncture the overlapping symbol.

6. The method according to claim 1, wherein the method further comprises:
sending, by the terminal, a first notification indication to the source cell, wherein the first notification indication comprises a station indication, and the station indication is used to indicate a station to which the symbol that needs to be punctured belongs, wherein the station is the source cell.

7. A terminal, applied to handover of the terminal from a source cell to a target cell, wherein the terminal comprises:
at least one processor;
one or more memories coupled to the at least one processor and storing programming instructions for execution by the at least one processor to:
determine, according to a symbol puncturing rule, a symbol that needs to be punctured, wherein the symbol that needs to be punctured is an overlapping symbol between a symbol used to send the uplink signal to the source cell and a symbol used to send the uplink signal to the target cell; and
a transceiver, configured to send the uplink signal to the target cell based on the symbol that needs to be punctured, wherein the symbol puncturing rule is predefined in a protocol.

8. The terminal according to claim 7, wherein the transceiver is further configured to send a first capability indication to the source cell, wherein the first capability indication is used to indicate that the terminal supports time division handover.

9. The terminal according to claim 8, wherein the transceiver is further configured to receive a first enabling indication from the source cell, wherein the first enabling indication is used to indicate to enable time division handover of the terminal.

10. The terminal according to claim 7, wherein the transceiver is further configured to send a second capability indication to the source cell, wherein the second capability indication is used to indicate that the terminal supports puncturing of the overlapping symbol.

11. The terminal according to claim 10, wherein the transceiver is further configured to receive a second enabling indication from the source cell, wherein the second enabling indication is used to indicate that the terminal is enabled to puncture the overlapping symbol.

12. The terminal according to claim 7, wherein the transceiver is further configured to send a first notification indication to the source cell, wherein the first notification indication comprises a station indication, and the station indication is used to indicate a station to which the symbol that needs to be punctured belongs, wherein the station is the source cell.

* * * * *